(12) United States Patent
Franksson et al.

(10) Patent No.: US 10,279,526 B2
(45) Date of Patent: May 7, 2019

(54) METHOD FOR INJECTION MOLDING PLASTIC PARTS BY AN INJECTION MOLDING MACHINE

(71) Applicant: PLASTICS UNBOUND GMBH, Zürich (CH)

(72) Inventors: Olof Franksson, Danderyd (SE); Robert Axelsson, Gränna (SE)

(73) Assignee: Plastics Unbound GmbH, Zürich (CH)

(*) Notice: Subject to any disclaimer, the term of this patent is extended or adjusted under 35 U.S.C. 154(b) by 151 days.

(21) Appl. No.: 15/139,932

(22) Filed: Apr. 27, 2016

(65) Prior Publication Data

US 2016/0236390 A1 Aug. 18, 2016

Related U.S. Application Data

(63) Continuation of application No. PCT/EP2014/073688, filed on Nov. 4, 2014.

(30) Foreign Application Priority Data

Nov. 4, 2013 (EP) .................................... 13191336
Mar. 28, 2014 (EP) .................................... 14162238

(51) Int. Cl.
  *B29C 45/73* (2006.01)
  *B29C 35/02* (2006.01)
  *B29C 33/04* (2006.01)

(52) U.S. Cl.
  CPC ...... *B29C 45/7312* (2013.01); *B29C 35/0294* (2013.01); *B29C 45/73* (2013.01);
  (Continued)

(58) Field of Classification Search
  CPC . B29C 35/0294; B29C 35/041; B29C 35/045; B29C 35/049; B29C 45/2675;
  (Continued)

(56) References Cited

U.S. PATENT DOCUMENTS 3,181,200 A 5/1965 Joseph
3,281,390 A * 10/1966 O'Leary, Jr. ............ C08L 23/12
                                                         524/583

(Continued)

FOREIGN PATENT DOCUMENTS

DE   1 938 496 A1   2/1971
DE   23 31 426 A1   1/1975
              (Continued)

OTHER PUBLICATIONS

International Search Report, PCT/EP2014/073688, Apr. 1, 2015.
(Continued)

*Primary Examiner* — Yogendra N Gupta
*Assistant Examiner* — Ninh Le
(74) *Attorney, Agent, or Firm* — Winston & Strawn LLP

(57) ABSTRACT

An injection molding method that includes: (a) fitting an injection molding machine with an injection mold defining one or more molding cavities, with at least one mold plate provided with one or more channels for circulation of a tempering medium, (b) providing a feed of plastic material, (c) heating the molding cavities by circulating through the channels a first tempering medium, (d) injecting plastic material into the closed heated mold to fill the molding cavities, (e) cooling the molding cavities of the filled closed injection mold until at least partly solidifying the molded plastic parts by circulating through the channels a second tempering medium, (f) opening the injection mold by parting the injector plate from the ejector plate, (g) ejecting the at least partly solidified molded plastic parts by actuation of ejector pins of the ejector plate, and (h) repeating the cycle of steps (c)-(g).

20 Claims, 5 Drawing Sheets

(52) U.S. Cl.
CPC .............. *B29C 2033/042* (2013.01);
*B29C 2045/7356* (2013.01); *B29C 2045/7393*
(2013.01)

(58) Field of Classification Search
CPC ............ B29C 45/2737; B29C 45/7306; B29C
45/7337; B29C 45/73; B29C 45/78; B29C
45/762; B29C 45/7312; B29C 45/2642;
B29C 2045/7356; B29C 2033/042
See application file for complete search history.

(56) References Cited

U.S. PATENT DOCUMENTS

| | | | |
|---|---|---|---|
| 4,462,780 A | | 7/1984 | Stavitsky et al. |
| 4,828,769 A | * | 5/1989 | Maus .................... B29C 45/263 |
| | | | 264/1.31 |
| 5,744,173 A | | 4/1998 | Sterett |
| 5,944,087 A | | 8/1999 | Sterett |
| 6,203,731 B1 | * | 3/2001 | Kato ....................... B29C 45/00 |
| | | | 264/328.16 |
| 6,290,882 B1 | | 9/2001 | Maus et al. |
| 2012/0053718 A1 | | 3/2012 | Grimm |
| 2013/0004698 A1 | | 1/2013 | Stillwell et al. |

FOREIGN PATENT DOCUMENTS

| | | |
|---|---|---|
| DE | 30 17 559 A1 | 11/1981 |
| DE | 92 01 642 U1 | 7/1992 |
| DE | 10 2006 008 359 A1 | 8/2007 |
| GB | 2478796 A | 9/2011 |
| JP | 10-29215 | 2/1998 |
| JP | 2010-36588 A | 2/2010 |
| WO | 94/13454 A1 | 6/1994 |
| WO | 97/31733 A1 | 9/1997 |
| WO | 00/74922 A1 | 12/2000 |
| WO | 03/011550 A2 | 2/2003 |
| WO | 03/031149 A1 | 4/2003 |
| WO | 2010/127990 A1 | 11/2010 |
| WO | 2012/055872 A1 | 5/2012 |
| WO | 2013/126723 A1 | 8/2013 |

OTHER PUBLICATIONS

International Preliminary Report on Patentability, PCT/EP2014/073688, dated Jan. 14, 2016.
International Search Report, PCT/EP2014/073707, dated Feb. 27, 2015.
International Preliminary Report on Patentability, PCT/EP2014/073707, dated Feb. 23, 2016.
Bank, "Why Plastic Flows Better in Aluminum Injection Molds," XP-002722375, pp. 1-8 (2008). www.alcoa.com/mold/en/pdf/spiral_report.pdf.
Knights, "Hot/Cold Thermal Cycling of Injection Molds Heats Up," Plastics Technology, pp. 1-4 (2010). www.ptonline.com/articles/hot-cold-thermal-cycling-of-injection-molds-heats-up.
Lammon, "Dispelling Aluminum Tooling Myths," XP-002722374, pp. 1-4 (2010). www.moldmakingtechnology.com/articles/dispelling-aluminum-tooling-myths.
Naitove, "'Passive Variotherm' Cooling Cuts Cycle Time at Low Cost," Plastics Technology, pp. 1-2 (2015). www.ptonline.com/articles/passive-variotherm-coolilng-cuts-cycle-time-at low-cost.
Ridder et al., "The Possibilities and Limitations of Variable Mold Temperature Control," XP-008113016, Kunstoffe International, pp. 22-29 (2009).
Xie et al., "A novel approach to realize the local precise variotherm process in micro injection molding," Microsyst Technol., pp. 1-7 (2012).
"Flowing Hot and Cold Brings Product Improvement," Free Online Library, pp. 1-5 (2009). www.thefreelibrary.com/Flowing+hot+and+cold+brings+product+improvement.-a0201368793.

* cited by examiner

METHOD FOR INJECTION MOLDING PLASTIC PARTS BY AN INJECTION MOLDING MACHINE

CROSS-REFERENCE TO RELATED APPLICATIONS

This application is a continuation of International Patent Application PCT/EP2014/073688 filed Nov. 4, 2014, which claims the benefit of European patent applications nos. 14162238.1 filed Mar. 28, 2014 and 13191336.0 filed Nov. 4, 2013. The content of each prior application is expressly incorporated herein by reference thereto.

BACKGROUND

The present invention relates to a method for injection molding plastic parts by means of an injection molding machine, in particular a method for injection molding thermoplastic polymeric parts of any kind to any shape.

A conventional injection molding machine for medium and large scale manufacturing of plastic parts has a granular plastic feedstock material injection wherefrom plastic feedstock material is conveyed slowly towards an injection gate of an injection mold, e.g. using a conveyor screw or plunger. On its way to the injection gate the plastic feedstock material passes through a heating section so that it melts and can be injected under high pressure into the injection mold.

The molten plastic is injected in a shot, which is the volume needed to fill the molding cavity, compensate for shrinkage, and provide a cushion to transfer pressure from the conveyor system to the molding cavity. When enough material has gathered at the injection gate, the molten plastic is forced at high pressure and high velocity to run along sprue bushings/runners into the one or more cavities of the injection mold. These molding cavities of the injection mold are defined between an injector mold plate and a closely contacting opposite ejector mold plate that together delimit one or more molding cavities and confine the injected volume of melted plastic. The injection mold with its molding cavities is at a temperature below the solidification temperature of the plastic material injected. Pressure is maintained until the sprue at the injection gate solidifies so that no more material can enter the one or more cavities. Then the screw or ram of the conveyer system reciprocates the same distance as the screw or ram travelled forward when filling the one or more molding cavities, and acquires plastic material for the next cycle while the plastic material within the mold cools and solidifies so that it can be ejected in a dimensionally stable state. Such a conventional injection molding machine is e.g. known from International patent application no. WO 2012/055872.

Solidification can in some applications be assisted by means of cooling lines in the mold. A cooling medium, such as water or oil, circulates the cooling lines to achieve appropriate cooling. In such embodiments the mold is kept cold during shot injection so that solidification of the molten plastic feedstock material starts almost instantaneously at the beginning of filling the one or more molding cavities, the one or more molding cavities being identical or different. Once the required cooling temperature has been reached, the mold opens and ejector pins ejects/eject the solidified part(s) from the injection mold, and the process is repeated.

International patent application no. WO 2003/11550 discusses the most common ways to reduce the time required for the molding cycle. One stated way is to keep the temperature of a mold low to reduce the time required for cooling, however the disadvantages of this is that the surface quality of the molded part is worse than if slow cooling is allowed. Fast cooling also induces large residual stress in the molded part. So cold molding is not suited when molding e.g. thin parts along a long flow path. Such a resulting molded part is often uncomplete. A further problem is that too rapid cooling of a molded part within a cold mold can prevent crystallization of the resulting product thus deteriorating the quality of the final part. Injection can in some applications be assisted by means of heating the injection mold. This can be achieved by means of heating bars, heat films, cooling lines with a cooling medium (such as water or oil) circulating, etc. In such embodiments the mold is kept warm during the mold cycle so that the molten plastic flows easier when injected, but notably the mold is still cold enough to give ample solidification of the plastic during cooling when the cavity is full.

WO 2003/11550 speaks against a system where a cooling fluid is circulated alternately after circulating a heating fluid during a molding cycle, stating that such a machine and apparatus is quite complex, and also that the time required for a molding cycle becomes longer. Instead an integrated cooling shell is provided. The molding cycle involves injecting the feed at high pressure, as in other conventional methods and injection molding machines, and thus involves the resulting associated disadvantages, such as high pressure in the closed filled injection mold and need for high clamping force. Furthermore, the process requires considerable power consumption for both induction heating and for circulating cooling fluid, which contributes to making final molded parts very expensive. The use of specific layers and the induction heating also results in the molds wearing down fast.

Injection molds are generally made from tool steels, although stainless steel molds and aluminium molds are known to be suitable for certain applications. Aluminium molds have relatively short life time in number of mold cycles, but may though be preferred for low volume applications in conventional injection molding machines since mold fabrication costs are low and mold manufacturing time fast. It is e.g. known from German patent application no. DE 3017559 to use aluminium for a part of an injection mold, but not for the complete injection mold. For high volume production steel molds are better than aluminium molds because steel are not similarly prone to wear, damage, and deformation during the injection and clamping cycles, as aluminium. So mold materials are selected in view of duration, acceptable wear, the molds susceptibility to expansion when subjected to thermal fluctuations and changes, and to the plastic material intended to be used with it.

The Variotherm process proposes some remedies to the above disadvantages by using heating/cooling liquids in injection mold temperature control. The cavity wall of the mold is heated prior to injection of the melt to a temperature that exceeds the glass transition temperature of the melt. Then melt at is injected in the mold. It is explained that the already tempered mould surface is heated also by the hot plastic melt during the injection process, which indicates that the melt is at higher temperature than the injection mold, and thus of the heating liquid, so that onset of solidification can start early. After filling of the cavity the mold is cooled till the molded part has the necessary deforming temperature. As just emphasized the cooling of the hot plastic starts as soon as the melt enters the cavity, and then progresses with active cooling of the mold when the cavity has been filled completely, lasting until the plastic part has reached the required temperature for deforming. A reduction of up to 40% of the injection pressure is asserted offered by the Variotherm method. Also the clamping forces are indicated reduced. Despite that the Variotherm process was developed in 1970s the Variotherm concepts like oil heating/cooling and gas heating/cooling of injections molds are not widely applied. [*A novel approach to realize the local precise Variotherm process in micro injection molding*", Lei Xie, Thalke Niesel, Monika Leester-Schädel, Gerhard Ziegmann, Stephanus Büttgenbach, Microsyst Technol., Springer-Verlag Berlin Heidelberg 17 Oct. 2012].

The company SINGLE Temperiertechnik GmbH, Ostring, Hochdorf, Germany has utilized the Variotherm process in The Alternating Temperature Technology (ATT). The cooling/heating channels of the injection molds are two separate closed, embedded in-mould circuits, SWTS circuits, that contain thermal fluid with different temperatures. Both SWTS circuits contain the same fluid. Water is recommended for temperatures of up to 200° C., while oil is suitable for very rare applications that operate with temperatures of up to 300° C. The system is equipped with an external valve station for switching the two circuits from bypass mode to mold temperature control mode. The circuits are made by Lasercusing, by building up layers of steel powder to form internal closed contour-aligned mold heating/cooling channels. The heating/cooling circuits of the molds that SINGLE uses for ATT are neither drilled or milled into the metal. Some of the disadvantages of ATT includes that these channels cannot be altered for e.g. width, accessed for cleaning if clogged, or inspected for defects, such as may occur due to erosion and pitting due to contact of mold metal with cooling/heating medium. Moreover the distance between the cavity and the circuit must be sufficient thick to avoid accidental breakage when pressurized heating/cooling medium passes through the lasercused circuits, when the mold plate are held forcibly together, and be able to resist injection pressure of the melt.

EP0335388 relates to a method of injection molding wherein the temperature of the injection mold is raised above the melting point of the plastic material through circulation of a heat carrier before injecting plastic material into the injection mold. The channels for the heat carrier are obtained by providing a gap between an insert and a cavity surface. The flow of the heat carrier is shot off through the injection mold upon injection of plastic material into the injection mold. After the cavity is filled with plastic material the injection mold is cooled to a temperature below the freezing point of the plastic material through suitable circulation of the heat carrier. The flow of the heat carrier through the injection mold is interrupted when injecting material into the cavity so that the temperature of the walls of those parts defining the cavity cannot be affected further, The passageways for the heat carrier are used for support during introduction of the material making the mold parts vulnerable for mutual displacement and leakage of heat carrier into gaps and cavities.

U.S. Pat. No. 5,423,670 discloses a similar device and method. During the preparation of the plastic material in the injection molding machine, the temperature of the cavity surface plates is raised to a level about the melt temperature of the material being molded. The tool cavity is warmed rapidly and uniformly before the material is forced into the cavity so that the injection pressures required to fill the cavity is reduced. Once the material completes filling the cavity a flow of coolant fluid cools the cavity insert plate by removal of the resident heat present in the cavity insert plate due to the preheating and the latent heat stored in the molten plastic. U.S. Pat. No. 5,423,670 provides no indication of suitable injection pressure.

WO00/74922 discloses a system and method that combine multiple opposing gates to reduce the meltflow pathlength and thereby reduce aspect ratio. The method includes non-isothermal steps of firstly, heating the mold surfaces with circulating heat transfer fluids supplied by a hot side supply system, to a temperature setpoint sufficiently high to retard solidification. Then secondly, injecting the melt through the opposing gates, then thirdly, rapidly cooling to solidification by circulating heat transfer fluids of much lower temperature, supplied from a cold side supply system. Each injection molding cycle thus starts with a heating phase, wherein the fast rise in mold surface temperature comes from a combination of high-thermal-conductivity metal (preferably, copper alloy) mold cavity materials, plus a very large thermal driving force being supplied by the hot side supply system fluid (preferably, steam). This fluid has a temperature well above the melt-solidifying temperatures (Tg or Tm) characteristic to the thermoplastic. The heating phase and injection is then followed by a fast cooling phase, wherein molding surface temperature decrease is thermally driven by cold side supply system fluid (preferably cold water) temperatures well below the melt-solidifying temperatures (Tg or Tm) characteristic to the thermoplastic. The greater these temperature differences are, the faster this "non-isothermal" molding cycle will be. To overcome the problems of poor mold surface replication for the molded thermoplastic article and to be able to maximize microreplication of the finest surface detail and contour the mold cavity part forming surfaces of WO00/74922 are heated at least above a characteristic solid-liquid phase-change temperature which is characteristic of the thermoplastic polymer. For amorphous thermoplastic polymers such as polycarbonate and acrylics, the preferred setpoint is the glass transition temperature (Tg). For crystalline thermoplastic polymers melting point (Tm) is proposed. The preferred setpoint temperature of the cavity surfaces is selected to be sufficiently high so that the thermoplastic part being molded is not formstable at any higher temperatures, so the hot side fluid need to be somewhat hotter than the setpoint to keep the cavity surfaces above the setpoint temperature. Then after the molding cavity has at least been completely filled by the molten thermoplastic and before the mold is opened at the parting line, mold surface temperature is dropped to below the Tg or Tm. WO00/74922 realises the problem of the plastic feedstock material being very stiff, so that it will require high injection pressure to fill the mold, thus also high clamping force to hold the mold parts in closed contact. The mold of WO00/74922 is designed for variable volume molding cavities and has in-mould heating/cooling channels to resist high claiming force and high injection pressure. The backside of the mold is not altered. Machining of said backside for making tempering channels would make it impossible to have the insulating air gaps needed to preserve the essential property of variable volume molding cavities, nor does WO00/74922 make proposals to suitable injection pressures.

Although some of the prior art briefly mentions reduction of injection pressure in relation to heating the injection mold prior to injecting the melt none of the prior art gives advice of which injection pressures are suitable. All the injection molds of the prior art suggested for such cooling system are complex structures, e.g. composed of many detailed components such as shells or parts kept distanced from each other by pillar, fins, blocks, distance pieces, etc., which creates a lot of turbulence and uncontrolled holding time of tempering fluid, or are embedded channels that are expensive to manufacture and cannot be inspected. All prior art mentions compromises for the higher temperature used when injecting, due to time and thermal energy required.

Depending on the mold material some prior art methods that rely on heat transfer and high turbulence or rapid flowing of fluid in metal channels, such as water, may cause erosion corrosion, flow-assisted corrosion, or even cavitation of the tempering channels, which inevitable will reduce lifetime of the injection mold. The metal material between the tempering channel and the mold cavity may deform and the tempering channels may even rupture or deform during the injection molding process, when subjected to both clamping force and injection pressure. Accurate design of the injection mold, control of the temperatures of the injection mold at various stages of the molding process, selecting the injection pressure and guiding the flow of the tempering medium appropriately is outmost important.

SUMMARY OF THE INVENTION

It is the aim of the present invention to remedy at least some of the above disadvantages of prior art injection molding machines and methods, and to provide alternative methods and machines.

In a first aspect of the present invention is thus provided an injection molding method in which no significant clamping and/or locking force, injection pressure and/or injection speed is needed when injecting the melted plastic material.

In a second aspect the present invention provides a versatile plastic injection arrangement associated with the injection mold.

In a third aspect the present invention provides a method in which molded plastic parts with very high qualities and mechanical properties are easier to mold than when using conventional injection molding machines and methods.

In a fourth aspect the present invention provides a method in which material waste is reduced compared to conventional injection molding methods.

In a fifth aspect the present invention provides an injection molding method by means of which it is possible to make very thin-walled and/or geometrically complex plastic parts.

In a sixth aspect the present invention provides an injection molding method by means of which visually acceptable plastic parts can be made.

In a seventh aspect the present invention provides an injection molding method by means of which several different plastic parts can be made concurrently in an injection mold in one and the same injection molding cycle.

In an eight aspect the present invention provides an injection mold for the method and machine according to the present invention.

Within the context of the present invention an injection cycle is to be understood as a complete, repeating sequence of operations for injection molding a plastic part. The cycle time is the time required for such a cycle, including return of the machine and system to repeat the molding of a further part. The injection mold is the tool having one or more molding cavities, for one or more parts to be molded. The parts may be identical or different, as in a family mold or multi cavity mold. A cavity or a molding cavity is defined by opposite depressions, or set of depressions, in the mold halves. The depression forms the outer surfaces of the molded article, part or component.

An injector plate of the injection mold defines one of the mold halves. The injector plate is secured to a stationary clamping platen of an injection molding machine. An ejector plate of the injection mold is the opposite mold half. The ejector plate is secured to a moveable clamping platen, moveable by means of e.g. a hydraulic ram. The clamping platens applies a clamping force that keeps the injection mold halves close together during the molding cycle in response to the injection pressure exerted during injecting the melt/fluid plastic material into the one or more molding cavities and exerted by the injected melt/fluid plastic material confined inside the closed injection mold. The injection mold may be fitted with one or more cores, constituted by objects or protrusions able of forming holes and inner surfaces of the molded parts. Cores may be a permanent part of a cavity or be retractable. Retractable cores are used when molding parts in molding cavities not perpendicular to the direction in which the part is ejected from the mold. Retractable cores are automatically pulled from the mold prior to the mold opening and reinserted when the mold closes again and prior to injection.

The ejector plate is part of an ejector assembly having various ejector means, including ejection pins, —i.e. rods, pins or sleeves that push a molded part off of a core or out of a cavity of a mold—, ejector return pins, —i.e. projections that push the ejector assembly back as the mold closes—, and an ejector rod, i.e. a bar that actuates the ejector assembly when the injection mold opens. The operation and function of the ejector assembly are as in conventional injection molding machines and methods, and will not be discussed further in the present application.

The injector plate may have more than one gates serving as a channel through which the softened or melted plastic material flows into the molding cavity, including but not limited to a sprue gate for a sprue defining the passageway through which softened or melted plastic material flows from the injection nozzle to the mold cavity or runner system. The term sprue is often also used for the solidified plastic stalk of plastic left over from cutting the solidified molded part from the runner or sprue. A direct gate feeds directly into the one or more mold cavities. An edge gate is the entrance to the molded part from the runner located on the parting line of the mold halves. More than one direct gate or edge gate may be present in the present invention.

Runners in an injection mold are the feed channels, which connect the sprue with the direct cavity gate. The term runner is sometimes also used for the plastic piece formed in this channel. Runners may be hot-runners so that in the mold halves the runners are insulated from the molding cavities and are kept continuously hot.

Within the context of the present application the terms "processing window" or "processing window of a plastic material" can be used interchangeable and are to be understood as the temperature interval ranging from onset of glass transition until the start of degradation of the plastic material. The "processing window" or "processing window of a plastic material" include the melting temperature of a plastic material and the glass transition temperature interval. The "processing window" or "processing window of a plastic material" differs from plastic material to plastic material, and providers and suppliers of plastic material provide datasheets with information of said "window". Some plastic feed materials consist of more than one plastic component and are composite materials utilizing the different chemical and physical properties of the individual plastic components in conjunction or in synergy. New plastic materials and plastic composites are developed all the time. It is important to observe and relate to the information in the datasheets.

A preferred temperature within the processing window is the "processing temperature" of the plastic material, which is the temperature interval which each manufacturer recommends for working with the plastic material before entering the cavity. When injection moulding, the temperature of the plastic material typically is in this interval when exiting the nozzle of the heating feed screw of the injection moulding machine. Notably the interval is not set by the onset of glass transition or melting, but is lower than the start of degradation of the material.

The term "tempering medium" is used for a fluid selected from gases or liquids suited to hold a selected temperature for a time suitable to exchange thermal energy with the injection mold. Electric current and electromagnetic fields are excluded as "tempering medium", and thus also for heating any part of the injection mold by means of induction, except for any heat runner or core.

The novel and unique whereby the above and other aspects are achieved according to the invention is that the method comprises the steps of (a) fitting the injection molding machine with an injection mold defining one or more molding cavities, the injection mold includes an injector mold plate and a reciprocating ejector mold plate, wherein the backside of at least one of the mold plates is traversed by a respective one or more open channels for circulation of a tempering medium, (b) providing a feed of plastic material having a first temperature within the processing window of the plastic material, (c) heating at least the one or more molding cavities to a second temperature within the processing window of the plastic material and maintaining the injection mold in closed condition at said second temperature by circulating through the one or more channels a first tempering medium having a third temperature, (d) injecting the plastic material having the first temperature into the closed heated mold to fill the one or more molding cavities, (e) cooling at least the one or more molding cavities of the filled closed injection mold to a fourth temperature below the first temperature until at least partly solidification of the molded plastic part(s) inside the injection mold by circulating through the one or more channels a second tempering medium having a fifth temperature, (f) opening the injection mold by parting the injector plate from the ejector plate, (g) ejecting the at least partly solidified molded plastic part(s) by actuation of ejector pins of the ejector plate, and (h) repeating the cycle of steps (c)-(g) until the desired number of plastic parts is produced.

By the term "open channel of a plate" is within the context of the present invention inherently understood that any of the injector plate or ejector plate has a channel which is open until it is closed by another part, such as another plate or platen of the injection molding tool or injection molding machine, to serve at the one ore more channels for circulation of a tempering medium. Thus the tempering channels of the present invention are first finally created once the mold plates are in place in the tool or machine. The tempering channels can be opened for inspection.

Disfiguring marks on an injection molded part are almost unavoidable in conventional injection molding methods. Such marks can e.g. be parting lines on the molded part indicating where the two halves of the injection mold met in closing, flashes, i.e. leafs of plastic material leaking out from the molding cavity, or sprues resulting from the feed opening provided in the injection mold between the injection nozzle and the one or more molding cavities and/or the runner system, gate marks occurring at the gate of the channels through which the molten plastic material flows from the runner into the one or more molding cavities, or ejector pin marks being residual marks on the molded part caused by the profile of the ejection pin. Flashing may e.g. result from misalignments and clearances of mold plates, and/or from dimensional differences of the mating surfaces of the molding cavities when in the closed position of the injection mold being in contact with the injected plastic material. In conventional injection molding machines dimensional differences are e.g. occasioned by non-uniform, pressure-induced deformation during injection, machining tolerances of the injection mold, and non-uniform thermal expansion and contraction of the mold halves, which experience rapid cycling during the injection, packing, cooling, and ejection phases of the injection molding cycle. Since such marks are almost unavoidable the solution hitherto have been to design the injection mold halves in such a way that the marks are made at areas, which are visually hidden in use of the final molded part.

By means of the method according to the present invention disfiguring and detriment marks can be avoided to a large extent due to the injection mold already being heated to the second temperature by circulating a tempering medium inside the closes one or more open channels provided in the back side of any of the injector or ejector mold plates. Emphasis is made that the tempering channels are open until the respective plates are locked together with another plate of the injection molding machine which plate serves as a lid for the tempering channels. Usually the other plate of the injection mold need not be specifically adapted. This way a very versatile heating/cooling system of an injection mold can be created. The channels in the backside of the mold plate are unique to the mold, not the injection molding machine.

At the time the plastic material at the first temperature is injected in the closed injection mold, said plastic material is in a soft, viscous and processable condition, e.g. as a melt, and the injection mold is at the second temperature, which is also within the processing window of the plastic material. This way premature solidification of heated plastic material in gates, sprues or runners, and any of the one or more molding cavities, is prevented. The hot plastic material flows almost by itself into the one or more molding cavities without the need of applying high injection pressure and/or clamping force even close to the levels of conventional injection molding methods. In fact the injection pressure applied according to the present invention is at least less than 30% of conventional injection pressure. This counters the problem with plates being unintentionally forced apart thus inducing disfiguring flash on the parts molded. The low force also enables the use of more elastic mold materials, much smaller and thinner mold plates with thinner internal walls, more than 60% lighter mold plates, and weaker locking arrangements on the molding machine compared to conventional injection molding machine. The pressure exerted by the plastic material on the face of the injection screw or ram when injecting plastic material into the injection mold is low and friction reduced compared to conventional injection molding methods and machines. The injection molding pressure, thus the pressure applied to the screw to press and to force the plastic material at the first temperature in a ram to completely fill the one or more molding cavities, is smaller than in conventional injection molding methods and machines. Ram is to be understood as the forward motion of the screw inside the feed barrel to force the plastic material at the first temperature through a nozzle into the one or more molding cavities via gates, sprues and runners. The runners may for example be hot-runners, so that scrap formation is further prevented.

By means of the method according to the present invention plastic part(s) can be manufactured without at least one or more of removal of sprues, floating lines on the plastic part, meeting lines in the plastic parts behind tool cores, and tension in molded plastic parts. Due to the flowability in the hot injection mold of the soft, viscous plastic material at temperatures within the processing window a very homogeneous and rapid distribution of plastic material, e.g. in form of a melt, into the one or more molding cavities, takes place almost by itself, and the so obtained final injection molded part(s) solidify uniformly and are not susceptible to warpage, i.e. distortion caused by non-uniform internal stresses.

The provision of the one or more channels in the injector plate, which constitutes the stationary mold half, and/or in the ejector plate, which constitute the movable mold half, makes it possible to circulate a hot or a cold tempering media, respectively, to keep the favourable alternating temperatures of the injection mold, namely first hot during the injection of the plastic material, and then cold for solidification of the molded part(s) in the one or more molding cavities to complete an injection cycle. This way is achieved an inexpensive, simple but still controlled way of adjusting the temperature of an injection mold having backside with open tempering channels to any preferred temperature.

The second temperature may in any preferred embodiment be equal to or higher than the first temperature, although the invention will work for some plastic materials even if the second temperature is below the first temperature but within the processing window of the plastic material. In any preferred embodiment the fifth temperature can also be lower than the third temperature, even lower than the lowest temperature of the processing window of the plastic material, and/or the fourth temperature can be below the lowest temperature of the processing window of the plastic material. The lowest temperature of the plastic material is the glass transition temperature and the highest temperature is the temperature at which the plastic material starts to degrade. Proper selection of any of the first, second, third, fourth and fifth temperatures is done based on the material providers data of the processing window of the selected plastic material in view of possible processing conditions to obtain the high quality plastic part(s) of the present invention, thus plastic part(s) having the desired design, exact measures, dimensions and shapes, and no or limited disfiguring marks at the lowest possible manufacturing time and costs.

It might be preferred in steps (e) and (g) that the molded plastic parts proceed to almost complete or fully complete solidification prior to being ejected. This way is ensured that ejector pin(s) do not make undesired marks on the molded part. Some plastic materials may however prior to complete solidification reach a partly solid state in which the molded part has a temperature below the processing window and can be ejected for final solidification outside the injection mold without loss of intended shape and design, and without marks or depressions from contact with ejector pins. Ejecting molded part(s) even prior to complete solidification increases manufacturing speed and rate, and reduces manufacturing costs.

Melt viscosity increases with molecular weight, and consequently the injection pressure and molding pressure normally required in conventional injection molding methods and machines to fill any particular geometry of a molding cavity increases with plastic materials that have a very high molecular weight.

Thermoplastics are particular suited for use in the injection molding method of the present invention, and simply by adjusting the first, second, third, fourth and fifth temperatures appropriately, molecular weight can expediently be taken into consideration.

DELRIN® obtainable from DuPont is a first example of plastic polymers for use in the present invention. DELRIN® acetal resins are semi-crystalline, thermoplastic polymers made by the polymerization of formaldehyde, also commonly referred to as polyoxymethylene (POM). According to the datasheet (DuPont™ DELRIN® acetal resin, TECHNICAL INFORMATION) DELRIN® has very low amorphous content making the effect of glass transition temperature $T_g$ negligible and very difficult to measure. For DELRIN® acetal homopolymers the melting temperature $T_m$ is 178° C. and the recommended typical processing window is 210-220° C., within which the first temperature can be selected as.

Further examples include polypropylenes e.g. obtainable from INEOS Olefins & Polymers USA, 2600 South Shore Boulevard, League City, Tex. 77573. According to the material providers datasheet (INEOS Olefins & Polymers USA, Polypropylene Processing Guide) the polypropylenes are semi-crystalline polymers with a recommended processing window of 204-268° C.

Yet further examples are the high temperature amorphous thermoplastics sulfone polymers obtainable from Solvay Speciality Polymers USA, LLC, 4500 McGinnis Ferry Road, Alpharetta, Ga. 30005-3914, USA. According to the material providers datasheet (Processing Guide, RADEL® PPSU, Veradel® PESU, UDEL® PSU, ACUDEL® modified PPSU). The recommended processing window is 138-350° C.

The above examples constitute a non-exhaustive list of examples of resins and plastic materials suited for use in the present invention.

In the method according to the present invention there is no need to increase injection pressure and molding pressure excessively to cope with high molecular polymers and the method according to the present invention is not limited to specific thermoplastic polymeric materials. Due to the special provision of the open channels at the back side of the mold plates the injected plastic material and the injection mold typically are at substantially same temperature when the molding cavities are filled, to keep the plastic material in same state, and irrespective of which kind of plastic polymeric material to be processed, the temperatures of the present invention are chosen carefully to make sure that viscosity, plasticity and flow properties are optimized, and thus satisfactory and sufficient for the plastic material, which has a temperature within the processing window, to easily distribute into the one or more molding cavities. The first temperature, the second temperature and/or the third temperature is(are) regulated and controlled by the tempering medium flowing close to the one or more molding cavities due to the open tempering channels to prevent unintentional temperature drop(s). First after completion of the shot, the injection and filling of the one or more molding cavities, the temperature of the injection mold is lowered to the fourth temperature by circulating the second tempering medium at the fifth temperature through the one or more channels. So the temperatures of the method are conveniently preset according to the properties of the plastic material. The present invention reduces or even completely eliminates the need for high-pressure application. Since the temperatures of the first and second tempering medium can be controlled distanced from the injection mold, although having the selected and predetermined temperature for adjusting the molding cavity temperatures said temperatures are both fast and easy to adapt to various different processing windows of various different plastic materials.

As mentioned the one or more channels may preferably be provided in the vicinity of the one or more molding cavities, preferably so close to the molding surface of the one or more molding cavities that high thermal flux and conduction of thermal energy between the molded part(s), the tool material of the injection mold and respective first and second tempering medium, takes place fast, efficient and in a homogenous manner.

Even complicated molded part(s) can be made at no extra effort due to the superior management of thermal energy and heat exchange of the injection mold, the tempering media and the plastic material in accordance with the present invention.

As examples of complex molded parts which hitherto not have been possible to manufacture in a conventional injection molding method at high numbers at low costs can be mentioned:
  tube-formed parts with circular cross-sections. The tube-formed parts will actually be circular, whereas infallibly all tube-formed parts made in conventional injection molding methods and machines will have partly oval cross-sections,
  box-shaped injection molded plastic parts will not have their walls shrink-bending inwards towards the centre of the box,
  it is possible to make injection molded plastic parts having long narrow holes, because it is possible to use long thin tool cores with only one end fixation, although two-end fixation also is possible, and
  injection molded parts that are asymmetric and thus require molding cavities that are centreline-asymmetric can be made without gasping/leaking/venting features.

A further advantage by having an injection mold at a second temperature at the time it receives the shot of plastic material at the first temperature is that it makes it possible that the injection mold has an off-centred injection gate. Inevitable, the soft plastic material at the first temperature will flow unobstructed irrespective of the location of the injection gate, so an off-centered injection gate functions quite as well as a centred injection gate. Thus the invention is substantially independent of location of gate, which gate may even be adjustable, or there could be more than one injection gate. So the tool manufacturer has a substantial level of freedom to choose where to place the in-molding point, i.e. the gate running to a cavity, and an injection mold can be fitted on various injection molding machines.

The provision of the one or more channels in the injector plate and/or the ejector plate results in that one or more molding cavities as well as the molded plastic part(s) can be homogeneously heated and cooled during a molding cycle. The final molded plastic part(s) will have equal shrink fraction in all directions, i.e. isotropic shrinking, so that the shape of the molded part(s) mirror the shape of the one or more cavities exactly, and makes it possible to make e.g. good spheres and holes with more circular cross-section.

In a highly preferred embodiment of the method according to the present invention step (c) may further include heating the conveyor system for the feed of plastic material at any location upstreams the injection mold to a temperature within the processing window of the plastic material, e.g. the first temperature or higher, preferably the entire conveyor system is heated, so that feedstock of plastic material immediately is brought to the first temperature. In this embodiment the clamping force and clamping pressure applied to the injection mold to keep it closed during the injection step (c) and the molding cycle of steps (c)-(g) are both substantially lower than for conventional injection molding methods and machines. The fluid pressure of the plastic material within the one or more molding cavities and the runner system, are also low due to the first and second temperatures being selected within the processing window of the plastic material, even as low as less than 30% of conventional force and pressure. So any fluid pressure of the plastic material at the temperature within the processing window need only be compensated to minor extent by a clamping force and clamping pressure of an injection molding machine including a conveyer system configured so that the temperature of the plastic material feed is raised during conveyance and is at the first temperature when the feed reaches the injection gate of the also heated closed injection mold. The closed injection mold may e.g. have substantially same temperature as the incoming flow of plastic material feed. Except for smaller molds, prior art systems that utilizes alternate heating/cooling in plastic injection molding get into compromises between higher cost/complexity, longer cycle times, lower high temperatures for injecting. In practice they are operated with the mold cavities at temperatures where the plastic material injects easier than conventionally, sometimes even melted, but below the processing window of the material.

In step (c) air may be evacuated from the one or more molding cavities before proceeding with step (d) to prevent air trapped in the molded plastic part.

Due to low clamping pressure, clamping force and fluid plastic pressure in the closed injection mold, wear of the injection mold halves and flashing, i.e. leakage of plastic material from a cavity, are reduced substantially. One or both of the injector plate and the ejector plate can e.g. be made of a material such as aluminium or an aluminium alloy, which normally not is suited for high production numbers in conventional methods due to very fast wearing of the injection mold and lack of dimensionally stability. Since the injection mold and plastic feed both are hot, the cycle time is so short that an injection mold of aluminum is cooled prior to loosing dimensional shape. The choice of aluminum as tool material have no or only inferior impact on dimensions and shapes of the one or more molding cavities, and therefore same applies to the resulting molded parts. Aluminum will also provide for high thermal conductivity between cavity and tempering medium, and is easy to machine when manufacturing the mold. The higher the thermal conductivity of the mold/tool material is the better the mold is to acquire the temperature of the circulating tempering medium. The thermal conductivity of stainless steel is 16 W/(m° K), whereas aluminum has a thermal conductivity of 225 W/(m° K), and copper a thermal conductivity of 392 W/(m° K). The corresponding Elastic modulus' of steel is 200 GPa, Aluminum 69 GPa and Copper is 117 GPa. But although aluminum and copper has lower Elastic modulus' than steel, and the mold plate thus are less able to e.g. holding back locking forces etc., this fact does not constitute a problem because high locking force is not a requirement.

In step (d) the injection of melted plastic material can be made at an injection pressure as low as an injection pressure less than 200 kg/cm², preferably less than 100 kg/m², preferably less than 80 kg/cm², more preferred less than 60 kg/cm², and even more preferred at an injection pressure of between 20-50 kg/cm². Conventional injection molding methods require an injection pressure of 600-700 kg/cm², which is about 15-30 times higher and therefore more expensive, requires more energy, and causes earlier onset of wear of injection mold and injection mold machine parts. The Variotherm process and the prior art systems that utilizes alternate heating/cooling in plastic injection molding methods all operate at an injection pressure of about 200-250 kg/m², thus at a pressure much higher than that of the present invention.

Cold creep is often seen in conventional injection molding methods. Cold creep creates weld marks and meeting lines, in particular behind cores or core parts. Because the entire injection mold according to the present invention is maintained at a temperature within the processing window until the softened plastic material has combined into a homogeneous mass behind cores, and complete filling of runner system and the one or more molding cavities has taken place, no onset of solidification can take place too early to create cold creep, weld marks and meeting lines.

The first tempering medium has a good heat capacity so that it is able to keep at least a third temperature within the processing window of the plastic material, and to hold this third temperature for the injection and distribution stages of the molding cycle, thus at least for the duration of steps (c) and (d). The third temperature may e.g. be at least the glass transition temperature of the plastic material, such as at least 200° C., or even at least 300° C. The tempering channels facilitates keeping of such high temperature at minimum thermal fluctuations.

Lower temperatures of the first tempering medium may however be used in case the selected plastic material has a corresponding lower demand for application of thermal energy in order to make it processable within its processing window to an acceptable level. For producing polyvinyl chloride parts app. 140-180° C. may e.g. be sufficient. The first tempering medium circulating in the one or more channels can preferably be an oil, although other fluid tempering media, being liquids, such as water, or gases, also are contemplated by the present invention. The suitable first and second tempering media are selected to have a heat capacity sufficient to carry thermal energy to at least the mold cavities and from at least the molded part, respectively, to manufacture molded parts at high speed without compromising physical and mechanical properties of the final molded part. The skilled person is aware that tests and trials may be needed to establish optimum process parameters for a given injection molding task.

The first tempering medium and the second tempering medium can be circulated through the same or different one or more channels, optionally in response to opening and closing one or more valves associated with respective inlets for the one or more valves.

In case the first and the second tempering medium are circulated through different one or more channels of a respective plate, the second tempering medium could be any inexpensive tempering medium, including water or gas.

The hot first tempering medium may circulate in first one or more channels different from second one or more channels for cooling by the second tempering medium. This one embodiment is suited if the runner system is intended to be heat-runners.

Any tempering medium having suitable thermal properties and ability to circulate the one or more channels can, as stated above, be used, including gases and liquids. The third and fifth temperatures of the respective first and second tempering medium are chosen in dependency of the first, second and third temperatures, and in dependency of the required and desired solidification rate and speed. Selected temperatures may influence on molding cycle time.

Injector plates with an off-centre injector gate is within the framework of the present invention. Due to the ease of flow and fast distribution of plastic material in the runner system and the one or more molding cavities, which plastic material has a first temperature within the processing window, the location of the injector gate and nozzle is not critical to obtain even and fast distribution of heated plastic material inside the one or more cavities of the injection mold. Such an injector plate may even be used with different injection molding machines, without the need to take special precautions to nozzle location or need to make a special design of tool. The plastic material, which has a first temperature within the processing window, can even be directed to a gate of preference to fill a certain cavity prior to another. More nozzles, more injector gates and more edge gates are also a possibility, which enables injection in several molding cavities at the same time. The injection mold may even be divided into two or more independent sections having each their nozzles and individual injector gates. In such an embodiment different plastic materials, e.g. having same thermal properties, can be injected in each their section, and one kind of part, or different kinds, or set of parts be manufactured simultaneously.

In a preferred embodiment any of the first tempering medium or the second tempering medium flows in one or more open channels of any of the ejector mold plate or the injector mold plate designed as a continues channel having an inlet in one free edge of the respective mold plate and an outlet in an opposite free edge, wherein the one or more open channel between the inlet and the outlet is(are) a chicane of tight turns in opposite directions, which tight turns are defined by a plurality of upright walls that delimit channel legs, preferably as least some of the upright walls are substantial parallel.

Preferred dimensional parameters of the open channels are:
- a channel leg turning radius between 6.0-30 mm,
- a number of channel legs between 3-10,
- a channel leg having a length about 200 mm,
- a total length between 600-800 mm,
- a depth between 20-60 mm,
- a channel leg having a width of 3.0-5.0 mm,
- a channel leg thickness between 3.5-5.0 mm, or
- a thickness of metal goods between channel and molding cavity of 3.0-5.5 mm.

By testing for best performance the inventors of the present invention has realised that by using a conventional machining tool a satisfactory open channel in a mold plate backside for optimum performance has the below features:
- a channel leg having a length of about 140 mm,
- five channel legs,
- a total length of between 700 mm,
- a depth of between 20-40 mm,
- a channel leg having a width of 4.2 mm,
- a channel leg thickness of between 3.8 mm, or
- a thickness of metal goods between channel and molding cavity of 4.0 mm.

As for operational parameters of the first optimum cycle time is obtained is the second temperature is at about 20° C. higher than the first temperature. Further the fifth temperature should be at least 20° C. lower or more than the fourth temperature. Preferably the second temperature is 20° C. higher than the first temperature and the fifth temperature is 20° C. lower than the fourth temperature.

A suitable second tempering medium is a mineral oil having a fifth temperature of 40° C. or below, optionally 30° C.

The invention also relates to an injection mold including an injector mold plate and a reciprocating ejector mold plate.

These two plates define one or more molding cavities in the closed state of the injection mold. At least one of the plates has a backside provided with one or more open channels configured for during injection of plastic material, which is at a first temperature within the processing window of said plastic material, circulating in the one or more molding cavities a first tempering medium having a third temperature of at least a temperature within the processing window of the injected plastic material to heat the one or more molding cavities to a second temperature, and for at least partly solidification of the molded plastic parts inside the injection mold circulating a second tempering medium having a fifth temperature selected for cooling at least the one or more molding cavities of the filled closed injection mold to a fourth temperature below the first temperature.

The fifth temperature may conveniently be lower than the third temperature to ensure the solidification. Optionally the fifth temperature is lower than the lowest temperature of the processing window, which fifth temperature is reached at the end of an injection molding cycle.

The one or more open channels provided at the backside of a respective injector or ejector plate may in a preferred embodiment encircle the one or more molding cavities close to said molding cavities to enable very rapid heat exchange between tempering medium and plastic material in the one or more cavities, and thus to obtain fast molding cycle time.

In a preferred embodiment the one or more open channels of any of the ejector mold plate or the injector mold plate are designed as a continuous channel in the backside of said respective plate. This continuous channel has an inlet in one free edge of the respective mold plate and an outlet in an opposite free edge, and the section of the one or more open channel between the inlet and the outlet is(are) a chicane of tight turns in opposite directions, which tight turns are defined by a plurality of upright walls that delimit channel legs, preferably as least some of the upright walls are substantial parallel. Such a continuous channel provides for guided flow between inlet and outlet at minimum turbulence and thus minimum risk of wear metal.

The one or more channels may have same or individual inlets for a tempering medium depending on if the first and second tempering media are compatible, and if their respective heat capacities remain unaffected by a minor mutual dilution.

In a preferred embodiment the injector plate has one single continuous first tempering channel and the ejector plate has one single second continuous second tempering channel to provide the ultimate guidance and residence time of first and second tempering medium, which first and second tempering medium is the same or different, as well as optimum thermal transfer through wall between the bottom of the channel and all the mold cavities.

The one single continuous first tempering channel and the one single second continuous second tempering channel may both be chicanes of tight turns, preferably turns about 180°.

A preferred injection mold is described in applicant's copending European application no. EP14162238.1, and subsequent International patent application having the title "An injection mold, injection molding tool comprising the injection mold, methods of theirs uses and objects obtained" filed 4 Nov. 2014. The corresponding U.S. application has application Ser. No. 15/139,978 and is filed of even date herewith.

One or more valves may be associated with the one or more channels as a means for switching between circulation of the first tempering medium and the second tempering medium to heat and cool, respectively, relevant sections of the injection mold or the entire injection mold during an injection molding cycle. The control of the third and fifth temperatures can be made using e.g. a separate exterior heat exchanger or any other heating/cooling arrangements. A shunting valve mixing cooling and heating tempering medium, if compliant, can be used instead of or as a switching means to achieve intermediate temperatures, or temporal transitions, such as gradients.

A preferred injection molding machine for use in the above-discussed injection molding method may comprise the above described and configured injection mold, a heating system for heating a conveyor system for the feed of plastic material at any location upstream the injection mold to at least a temperature within the processing window of the plastic material, a pump arrangement for in turns circulating the first tempering medium having a third temperature and the second tempering medium having a fifth temperature through the one or more channels of the injection mold, and a valve system for controlling the switching between first and second tempering medium.

By also heating the conveyor system of the injection molding machine to at least a temperature within the processing window of the plastic material, such as the first temperature, the susceptibility of temperature fluctuations of the injection mold in response to injection of plastic material in the closed mold are substantially reduced. The rheological properties of a plastic material at a temperature within the processing window are expediently utilised during conveyance, injection and distribution inside the one or more molding cavities and runner system. The time interval for the screw to rotate, or a ram to create a shot, and return to original position, i.e. the recovery time, is also shorter than if solid feed are conveyed through a long part of the screw or ram barrel.

Clamping force and injection pressure can be kept at a minimum due to injecting low-viscous, fluid plastic material in the injection mold. Frictional wear of at least the barrel, screw and/or ram, and any other components of the molding tool, and wear of the machine in general, are also reduced even further when operating with the plastic material as a low viscous fluid during the entire length of the injections molding machine, and for the entire part of the molding cycle, and until the first tempering medium is exchanged in the one or more channels with the second tempering medium to initiate solidification. Lifetime of both injection mold and injection molding machine is generally prolonged compared to conventional injection molding machines operating at the high injection pressures mentioned above. Parameters of the conventional injection molding methods and machines causing disfiguring marks and tension in the final molded part are eliminated, or at least reduced to an insignificant minimum. So when using the method and machine of the present invention the tool designer has considerable freedom to design the tool parts of the injection mold because less disfiguring marks on the final injection molded part need to be hidden for the consumer's eye.

Due to the provision of the pump arrangement and valve system very effective cooling of the injection molded part(s) can be achieved. The cooling gradient over the area of the injector plate is held substantially constant. No undesired differential cooling due to one area of the molded part cools at a highly different rate can occur, nor will any of the mold surfaces have different temperatures. So warping, which can result from differential cooling, is not a problem. If the surface of a finished injection molded part begins to separate into layers due to said layer having being cooled one after the other strata or fish-scale-type appearances may suddenly become visible, however since differential cooling through the thickness of the injection molded part does not takes place in an injection molded part manufactured according to the present invention there is no risk of making an injection molded part that delaminate either. The injection molded part(s) obtained by the injection molding method and injection mold of the present invention have no evident striations or other marks on the molded-part surfaces that indicate melt flow directions or impingement.

The system for alternate heating and cooling of the injection mold of the present invention also provides for dimensional stability of the final injection molded part(s). The precise shape of the part(s) is retained and corresponds to the shape of its associated injection molding cavity, so the final injection molded part is almost congruent with its injection molding cavity.

The present invention also relates to molded part(s) made using any of the method, and/or the injection mold, and/or the injection molding machine described above. Some examples are given below. Emphasise is made that these examples are examples of complex parts normally problematic to manufacture at low costs and high speed using conventional injection molding methods and machines. The examples are thus not an exhaustive list.

Shrinkage is little and an injection molded part being as thick as 4 cm can be cooled without loss of dimensional stability and changes in transparency. In case of manufacturing thicker injection molded objects, heating and cooling can simply be made from both the ejector plate mold half and the injector plate mold half, respectively, to obtain a final solid molded unit having a thickness of up to about 8 cm.

It is also possible to injection mold a perfect transparent sphere. The sensitive cooling system and method of the present invention allows the softened plastic to solidify without crystallisation, which would make e.g. a solid sphere become opaque, as often seen in conventional injection molding methods.

The injection molding machine may advantageously further comprise an electronic operating system controlled by a computer programme for controlling the continuous injection molding cycle for obtaining a plastic part, preferably a thermoplastic part.

It is also possible to injection mold multiple different plastic parts in one and the same injection mold in one injection molding cycle. The low pressure and high temperature during injection allows unbalanced filling of the one or more cavities and of any areas of those without inducing the skewed mold mechanical load or leakage present in conventional injection molds and methods. For families of parts this provide for significantly lower costs— one mold only, and thus only one injection mold cycle for each set of parts, for the entire family.

It should be understood that any features described in relation to the injection molding method can be implemented in any of the injection molding machine and the injection mold and vice versa.

BRIEF DESCRIPTION OF THE DRAWINGS

Further details of the one or more channels of the mold plates for use with the method of the present invention is shown in the drawing wherein.

DETAILED DESCRIPTION OF THE INVENTION

An injector mold plate 2 and an ejector mold plate 3 together forms an injection mold 1 and is described below in common for all figures.

Figure 1:
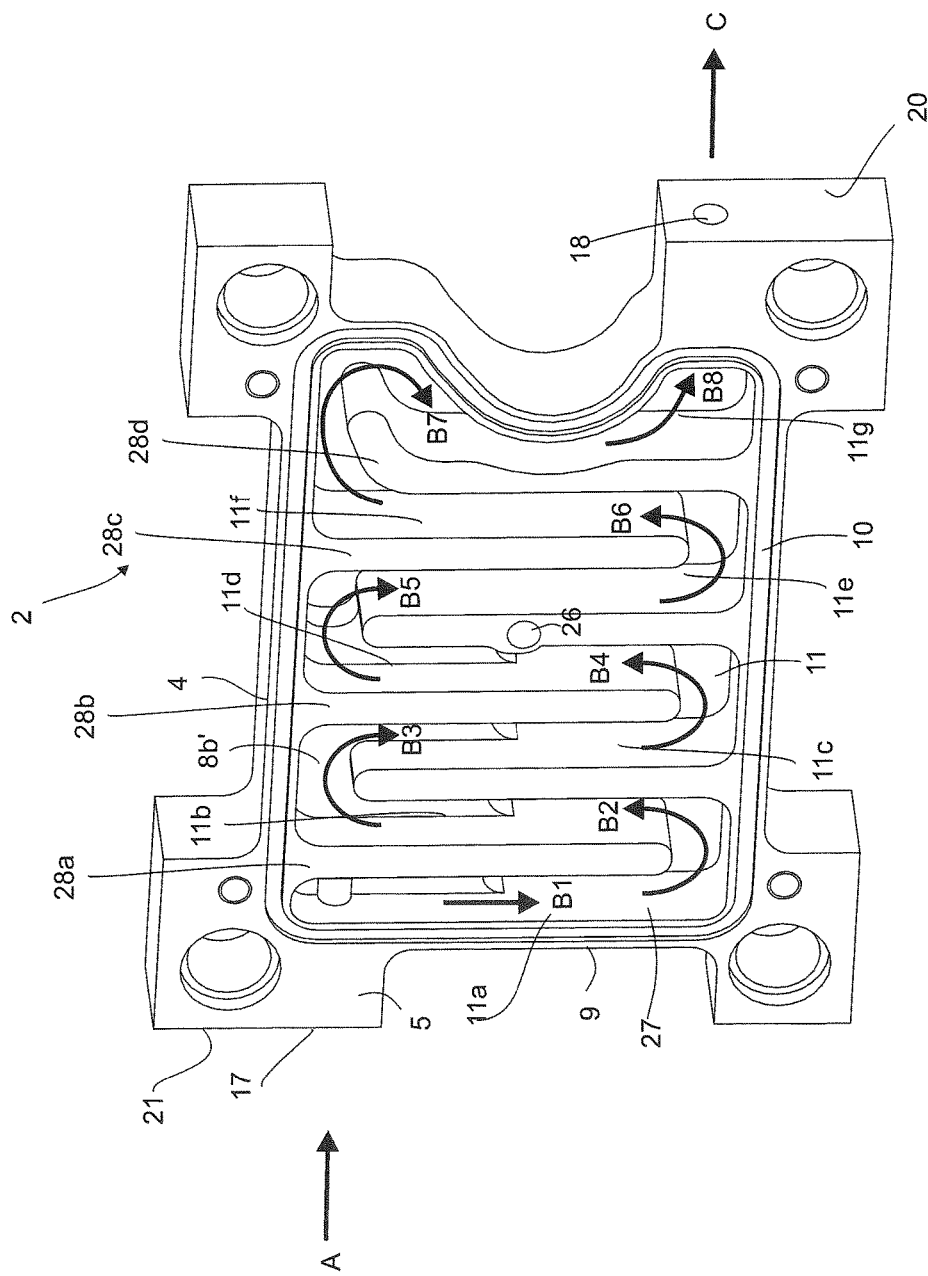
FIG. 1 shows an injector mold plate seen from the mold cavity face.
Figure 2:
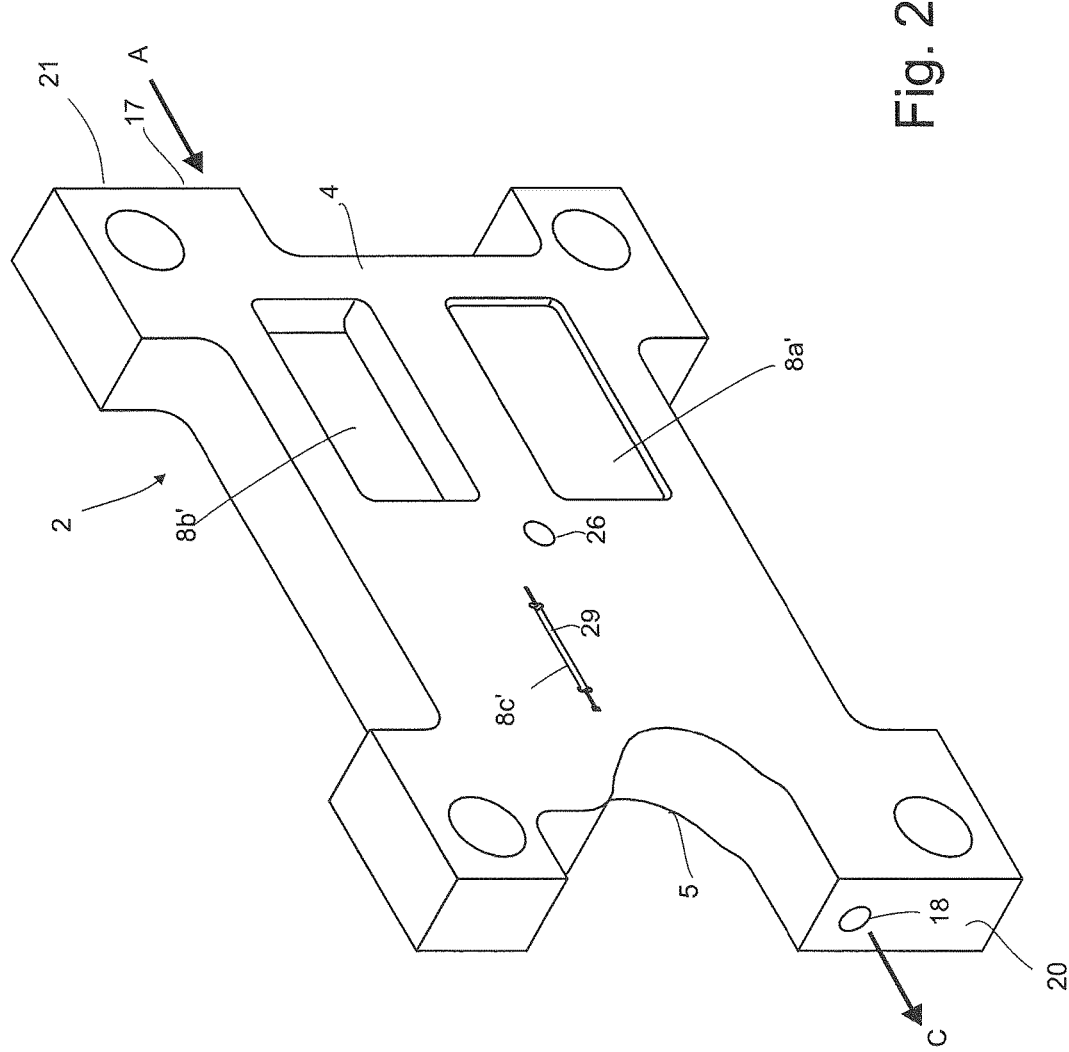
FIG. 2 shows the same seen from the backside.

The injector mold plate 2 seen in FIGS. 1 and 2 has a first injector mold plate face 4 and a backside being an opposite second injector mold plate face 5. The ejector mold plate 3 has a first ejector mold plate face 6 and a backside being an opposite second ejector mold plate face 7. The first injector mold plate face 4 faces towards the first ejector mold plate face 6, to as to define and delimit mold cavities 8a,8b,8c,8d when the injection mold is in closed condition. The mold cavities 8a,8b,8c,8d are composed by the first mold cavities halves 8a',8b',8c' formed in the first injector mold plate face 4 of the injector mold plate 2 and complementary second mold cavities halves 8a",8b",8c",8d" formed in the first ejector mold plate face 6 of the ejector mold plate 3.

The second injector mold plate face 5 has a first peripheral area 9 with a first circumferential recess 10 for a first seal for encircling at least one first continuous heating/cooling channel 11 for circulating a tempering medium when the injection mold is closed.

Similarly, the second ejector mold plate face 7 of the ejector mold plate 3 has a second peripheral area 12 with a second circumferential recess 13 for a second seal encircling at least one second channel 14.

The ejector mold plate 3 has a plurality of traverse passages 15 for ejector pins (not shown), and the traverse passages 15 for the ejector pins (not shown) has passage seals 16 to prevent leakage of tempering medium from the second channel 14 when ejector pins reciprocate to eject a molded plastic part in step (g).

The injector mold plate 2 has a first tempering medium inlet 17 and a first tempering medium outlet 18 provided through the opposite edges 20,21 of the injector mold plate and in communication via the first tempering medium channel 11. The ejector mold plate 3 has a second tempering medium inlet 22 and a second tempering medium outlet 23 provided through the edges 24,25 of the ejector mold plate and in communication via the second tempering medium channel 14. The location of inlets and outlets can be other appropriate place, including another edge.

An injection gate 26 communicates with the mold cavities 8a,8b,8c,8d defined by mold cavities halves 8a',8b',8c',8d'; 8a",8b",8c",8d" via runners.

The first tempering medium channel 11 has a first free opening 27 along its length that defines the flow path, a zig-zag chicane of tight turns defined by channel walls 28a,28b,28c,28d. The first peripheral area 9 that encircles the first tempering medium channel 11 provided for circulation of a hot or cold tempering medium from a source of first tempering medium, said first tempering medium being the same or different for cooling or heating respectively.

The first tempering medium is supplied to the injector mold plate 2 via the first tempering medium inlet 17, as indicated by the arrow A. Then the first tempering medium flows, as indicated by the arrows B1, B2, B3, B4, B5, B6, B7, B8, along the curvature of the adjacent first leg 11a, second leg 11b, third leg 11c, fourth leg 11d, fifth leg 11e, sixth leg 11f, and seventh leg 11g of the zig-zag, continuous chicane of tight turns of the first tempering medium channel 11, defined by channel walls 28a,28b,28c,28d above the one or more mold cavities 8a'8b',8c' until the first tempering medium exists via the first tempering medium outlet 18, as indicated by arrow C, and reverts to the relevant source for heat exchange and/or tempering before taking part in a subsequent tempering cycle. The first tempering medium is, due to the design, including curvature, length and different depths in view of position of mold cavities of the first tempering medium channel 11, able to sweep a very large area of the injector mold plate 2 in proximity to the one or more mold cavities 8a',8b'8c'. Residence time of the first tempering medium in the first tempering medium channel 11 is easily adjusted, e.g. by controlling the speed, start and stop regime, or other alternatives. Due to the large area being swept above the melt inside the mold cavities heat exchange by means of the first tempering medium is fast and effective and substantially uniform. Just a few cycles of first tempering medium may even suffice for one injection molding cycle. This way the injector mold plate 2 has been given a unique and versatile, easily adjustable tempering system of the method according to the present invention.

The injection mold 1 is kept heated by a tempering medium, such as a heated oil, during injection, and cooled by a tempering medium prior to and at least until beginning of opening the injection mold 1 for ejection of the molded part. Alternate heating and cooling of each or both the injector mold plate 2 and the ejector mold plate 3 need not take place simultaneously although this may often be the case. E.g. as soon as the injector mold plate 2 and the ejector mold plate 3 are parted to initiate ejection of the cooled molded part, heating of the injector mold plate can start anew to prepare the injector mold plate 2 for the next molding cycle. Avoidance of premature solidification of melt is easily contemplated due to tempering medium flowing through the tempering medium channels, which facilitates running of low viscosity melt to completely fill the one or more mold cavities of the closed mold. The affordable rapid thermal management according to the present invention of mold plates and mold cavities facilitates cooling and heating of both the injector mold plate 2 and the ejector mold plate 3 so as to easier adapt and follow an empirical thermal management scheme and/or a time schedule established theoretically or established just by doing tests and trials to obtain molded plastic parts of high quality. The thermal cycling in accordance with the present invention also supports and improves the alternate cooling and heating to perfect molded plastic parts, such as thin molded plastic parts, e.g. molded plastic parts having wall thickness of less than 1 mm, or enabling complicated molded plastic parts, which would have been almost impossible to make in a cost-efficient manner with conventional injection molding.

FIG. 2 shows the injector mold plate 2 from the first injector mold plate face 4, with the first tempering medium outlet 18 located in bottom left corner.

Two rectangular depressions 8a',8b' are provided, e.g. by machining, in the first injector mold plate face 4 of the injector mold plate 2 to serve as first mold cavities halves 8a',8b'. A third depression 8c' is provided as yet a first mold cavity half 8c' and serves for inserting a detachable separate tool core 29 from the side of the injector mold plate 2 to create a mold part with a long traverse hole. The tool core 29 is not yet positioned in its respective section of the mold cavity 8c'.

Figure 3:
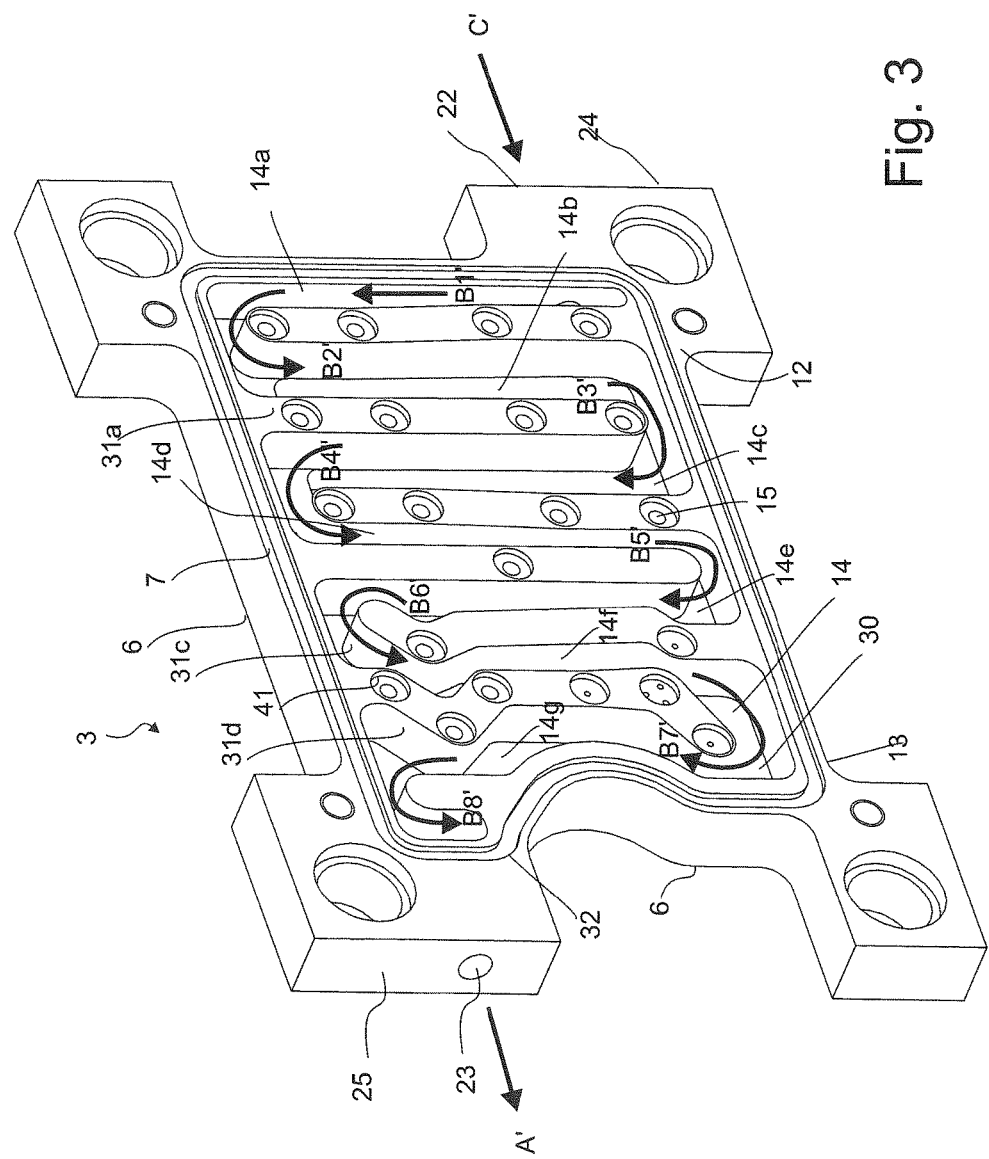
FIG. 3 shows an ejector mold plate seen from the mold cavity face.

FIG. 3 shows the ejector mold plate 3 seen from the second ejector mold plate face 7 and oblique from the short edge having the second tempering medium outlet 23. The second tempering medium channel 14 has a second free opening 30 along its length that defines the flow path, a zig-zag continuous chicane of tight turns defined by channel walls 31a,31b,31c,31d. The second peripheral area 12 that encircles the second tempering medium channel 14 has a second recess 32 for receiving a second seal 13.

The second tempering medium channel 14 is, as the first tempering medium channel 11, designed to allow flow of tempering medium through the adjacent legs of the chicane between the second tempering medium inlet 22, as indicated by arrow C', and the second tempering medium outlet 23, as indicated by arrow A', thus along the path from the second tempering medium inlet 22 via an eighth leg 14a, a ninth leg 14b, a tenth leg 14c, an eleventh leg 14d, a twelfth leg 14e, a thirteenth leg 14f and a fourteenth leg 14g of the chicane, as indicated by subsequent arrows, B1', B2', B3', B4, B5', B6', B7', B8'. The plurality of traverse passages 15 for ejector pins are provided in the goods of channel walls 31a,31b,31c,31d of the ejector mold plate 3 between the eighth leg 14a, the ninth leg 14b, the tenth leg 14c, the eleventh leg 14d, the twelfth leg 14e, the thirteenth leg 14f and the fourteenth leg 14g of the chicane.

Figure 4:
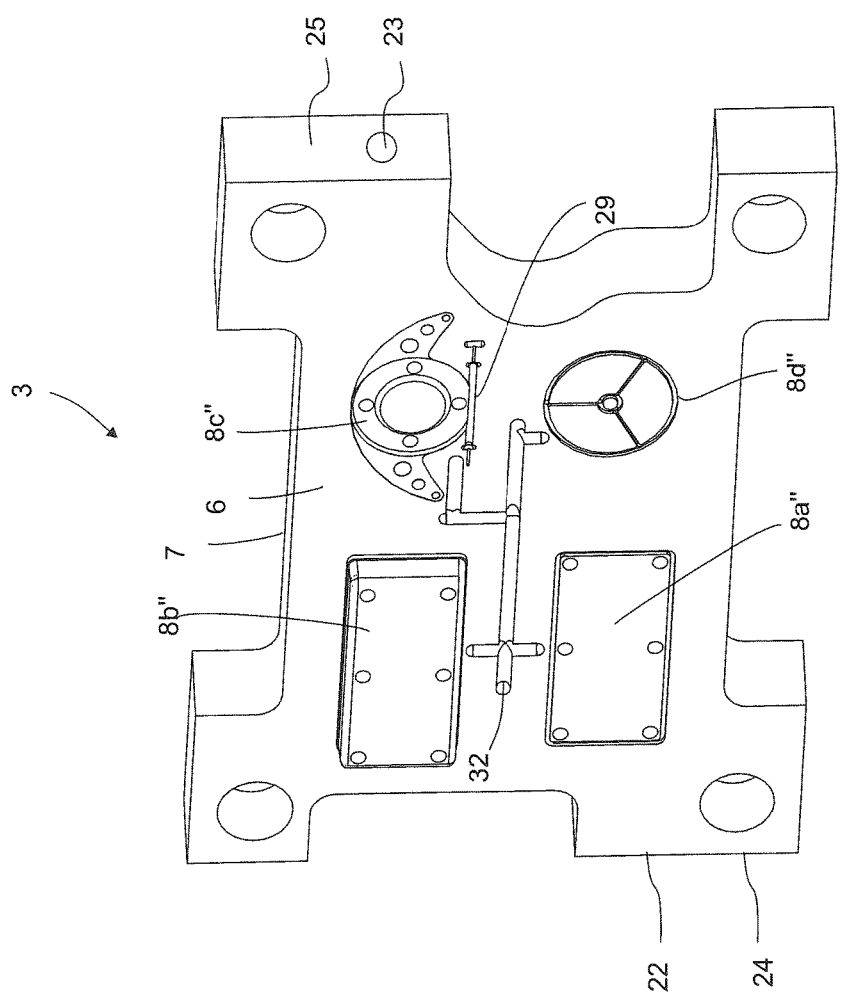
FIG. 4 shows the same seen from the backside.

FIG. 4 shows the ejector mold plate 3 from the first ejector mold plate face 6 to illustrate the different second mold cavity halves 8a''', 8b''', 8c''', 8d'''. A runner system 32, e.g. a runner system heated by using the second tempering medium channel 14, connects mold cavities 8a,8b,8c,8d with a nozzle (not shown) at the injection gate 26, shown in FIG. 1 to distribute a melt, e.g. hot thermoplastic material, fast to the injection mold 1. Second mold cavity halves 8a''' and 8b''' are the protruding cores, thus patrices, for mating with opposite cavities, thus matrices, in form of the first mold cavity halves 8a' and 8b' to create a molded plastic part having a three-dimensional shape defined by the gap between said patrix and said matrix when the injection mold is closed.

COMPARATIVE EXAMPLE

The Swedish engineering consultants Extero AB conducted tool plate tempering evaluations at a third party Injection molding plant with molding units and workshop facilities. Tempering rates where measured, as well as cycle step times studied and compared to conventional high-pressure injection molding. The results are shown in FIGS. 5 and 6.

Figure 5:
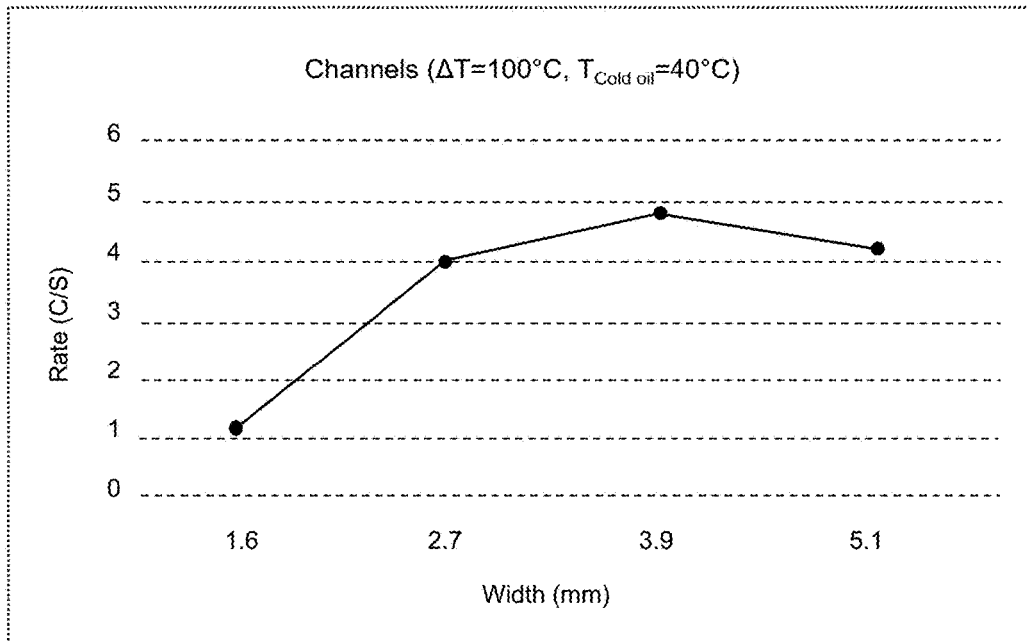
FIGS. 5 and 6 are graphs of tempering rates for a device according to the invention.

The tempering rate of the injection mold of the present invention for the curve shown in FIG. 5 has an optimum for the tempering channel width of ca 3.9 mm. Notably other measurements show that the optimum width varies with the temperature of the oil used. Narrow tempering channels restricts the tempering medium flow, in the present case the oil flow (lower tempering rate), slightly wider channels improve flow and tempering rate, while wide channels develop layers with low flow close to the tempering channel surfaces (lower tempering rate).

Figure 6:
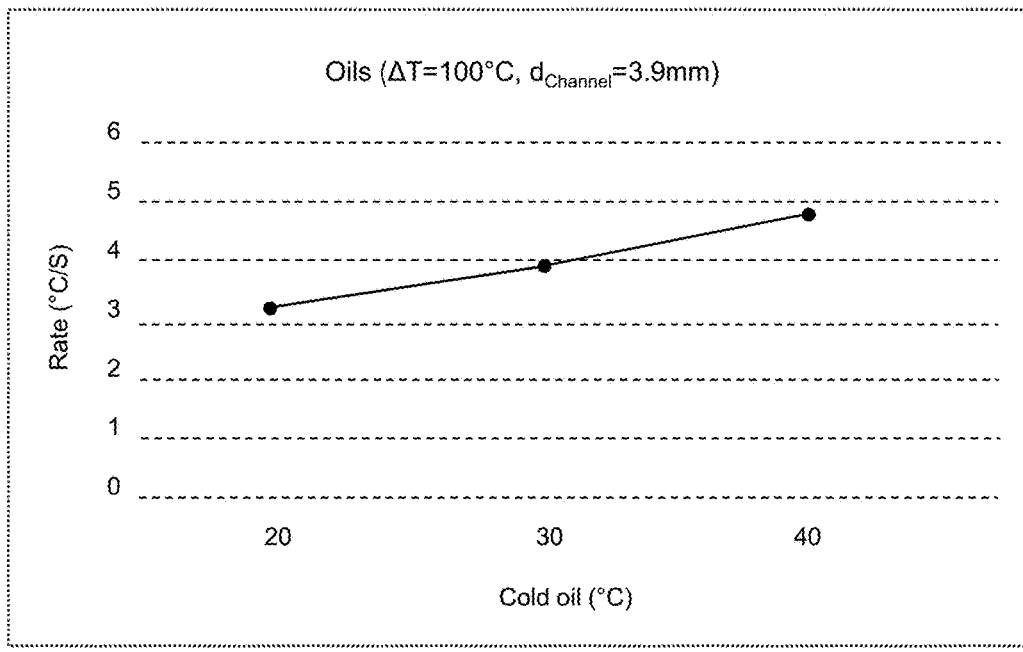

The tempering rate of the injection mold of the present invention for the curve shown in FIG. 6 increases with the temperature of the tempering medium, in the present case cold oil, i.e. warmer cooling oil gives better cooling (higher oil temperature give lower viscosity and higher flow, thus compensating for the decrease in tempering temperature differences).

The impact on the overall tempering rate (temperature change in ° C. per second on the surface of the cavity side—plastic part—of a full scale tool plate) was studied with different widths (slits) of the tempering channel for:

Various temperatures of a second tempering medium being a cooling mineral oil.

Various temperatures of a first tempering medium being a heating mineral oil.

Various temperature differences between hot mold plate and cooling mineral oil.

Various temperature differences between cold mold plate and heating mineral oil.

Testing was done using the following plastic materials:

ABS

PP (two different grades)

POM

In the trials one and the same Mid-sized mold had cavities for the following different sized plastic parts:

Rectangular box (see FIG. 4)

Wheel with spokes (see FIG. 4)

Half-moon wings (see FIG. 4)

Circular disc

For Small/mid-sized injection molding tools, conventionally injection molds and methods typically uses 20-40 sec of cycle time (Very- to Ultra-high volume production solutions excluded). Table 1 below illustrates the cycle time of 25 sec for a conventional Mid-sized injection mold. In order to conventionally injection mold the four different plastic parts of the trials, four separate injection molds (one for each part) in separate injection molding machine, each using 25 sec of cycle time are needed to produce one of each for these four plastic parts then require a total cycle time of 4×25=100 sec.

For the Small/Mid-size trial mold of the present invention 90 bar actual injection pressure was used for molding PP and 200 bar for molding ABS, where conventionally injection molding typically used about 900 bar for PP and about 1000 bar for ABS.

TABLE 1

| Step | Moulding (seconds) | | Remark |
| | Invention | Conventional | |
| --- | --- | --- | --- |
| Closing | 2 | 2 | |
| Heating (step c) | 15 | — | Not applicable for conventional injection molding methods |
| Injecting (step d) | 3 | 3 | Possibly faster for the invention |
| Cooling (step e) | 16 | 16 | |

TABLE 1-continued

| Step | Moulding (seconds) | | Remark |
| | Invention | Conventional | |
| --- | --- | --- | --- |
| Opening (step f) | 2 | 2 | |
| Ejecting (step g) | 2 | 2 | |
| Total (sec) | 40 | 25 | |

For Large-sized injection molding molds a conventionally injection molding method and mold typically uses 50-100 sec of cycle time. Table 2 below illustrates the cycle time of 50s for a conventional Large-sized mold. Cycle time however strongly depends on the wall thickness of the plastic part, typically >2.0 mm—rapidly increasing with the area of wall of the plastic part to facilitate the injection of the plastic material. These costly thicknesses (lot of plastic material) are normally unnecessary for the function of the plastic part, and only provided to enable the conventional molding.

In TMP the total cycle time for manufacturing one plastic part of 3.0 mm thickness is 50 sec as in conventionally molding time, but at the same time a lot of cost on plastic material is saved due to much thinner walls in the plastic part. The invention does not need thick walls to enable plastic when molded to reach all parts of the molding cavity.

TABLE 2

| Step | Moulding (seconds) | | Remark |
| | Invention | Conventional | |
| --- | --- | --- | --- |
| Closing | 2 | 3 | Lighter tool movable plate and fewer parts to move |
| Heating (step c) | 18 | — | Not applicable for conventional tool |
| Injecting (step d) | 5 | 7 | Easier to inject plastics in a hot cavity |
| Cooling (step e) | 19 | 33 | Faster cooling with Al-plates and aggressive cooling |
| Opening (step f) | 2 | 3 | Lighter tool movable plate and fewer parts to move |
| Ejecting (step g) | 4 | 4 | |
| Total (sec) | 50 | 50 | |

A summary of the features of the invention and its advantages in view of the prior art are provided below.

The prior art injection molding methods and apparatuses do not propose substantially use of no or very low pressures of the plastic material in feeds and cavities.

The present invention provides an alternative injection molding method in view of obtaining increased productivity and low manufacturing costs, to take up competition with low cost manufacturers of injection molded components. The present invention advantageously allows for manufacturing of injection molded parts of improved quality and having improved properties in view of same plastic parts made using conventional injection molding methods and machines and higher injection pressures. The present inventions does not require or induce at least one or more of removal of sprues, floating lines on the plastic part, meeting lines in the plastic parts behind tool cores, and tension in plastic parts.

The injection molding method and machines of the present invention utilizes a novel injection mold having open channels at the backside suited for temperature cycling of just one injection molding cavity, all cavities or the whole injection mold and/or feed channel too. This way substantially no or low pressure prevails in the one or more cavities of the injection mold during a molding cycle, i.e. no conventional injection molding high pressure of the plastic feed.

The present invention also enables multiple different parts to be molded in same injection mold.

Due to the cycling and fast exchange of thermal energy it is possible to make injection molds of materials having high thermal conductivity that generally are mechanically softer, and thus less capable to withstand pressure, than conventional injections molds of for example steel. A further advantage is that mechanically softer materials are easier and faster to machine, e.g. mill or cut, but is not suited for casted molds due to substantial shrinkage of mold metal material.

Due to the very low pressure in the injection mold during a molding cycle, the pressure the injection mold need to withstand without deforming or yielding can be made with less thickness of goods of injection mold material, which decreases mold material costs and make it easier to change temperature, simply because of less material to cycle thermally. The very low injection pressure makes it possible to remove a lot of material inside the mold plates, thus enabling the use of simple and inexpensive heat exchange arrangement, both in view of design and manufacturing.

The mold backside has an open channel patterns made by just rough milling etc., without complicated drilling and tubing.

The injection mold plate can be fitted on platens of an injection molding machine in an arrangement that is mechanically simple, is inexpensive, is small, requires low power, and in operation requires just small locking forces compared to conventional injection molds for making similar plastic parts.

Conventionally, as a compromise in the prior art, the one or more molding cavities have the same temperature during both injection and cooling. The unusual high temperature in the cavities of the injection mold according to the present invention during injection of plastic feed having a temperatures in the same range results in molded parts of improved high quality, and enables new features and properties of molded parts. Similarly the low temperature in the cavities of the injection mold during cooling gives short cooling time, without premature solidification during injection since the cavities then is rapidly cycled to high temperature again after the plastic part resulting from the injection molding cycle has been ejected from the opened injection mold. So the present inventions overcomes a prejudice in the field of injection molding against very fast cooling and delay for adjusting temperatures in alternate temperature adjustment, such as in the Variotherm process.

The risk that heat leaks to adjacent regions of the injection mold does not exist, because there are no such adjacent regions when the entire injection mold is heated. The heat exchange of the entire injection mold over a molding cycle is done via a simple, inexpensive system of well-distributed, designable versatile channels, the number, location and dimensions of which can be adapted according to parameters such as the nature of the feed plastic material and the design of the intended plastic part. There is no risk of uneven or only local heating/cooling as when heat exchange is done by fluid cycling of limited areas as in the prior art, or induction elements installed at specific locations of the injection mold.

Usable external temperature cycling arrangements are relatively inexpensive, and the same arrangement can be reused for all injection molds fitted on the platens. Moreover, it is possible to control the different temperatures very precisely from locations outside the injection mold, even from remote locations.

None of the novel and inventive injection molding machine, the injection molding method and the injection mold of the present invention are a challenge for the operator or the mold manufacturer, because no complicated and numerous mold components needs to be assembled, nor need the mold manufacturer be trained for making embedded tempering channels. No new training is needed for designing the injection mold halves of an injection mold according to the invention, no new workshop machinery or skills are needed for injection mold manufacturing, and no new skills are needed for injection molding operations, all of which are needed for similar prior art methods, machines and molds making use of fluid cycling of limited areas, or use of inclusion of induction elements. The injection mold can have low weight and be easy and fast to fit.

Some of the challenges when cycling between heating and cooling of one and the same injection moulding tool are:

Schemes for heating using pressurised water (like a pressure water nuclear plant) have turned out to be impractical. It is complex and dangerous.

Alternating between hot oil and cold water is impractical because of steam generation when cold water hits hot parts, and difficult to control mixtures of oil/water.

Parallel separate heat exchange channels for water and oil are inefficient. 50% tool heat exchange surface each and interference because boiling water in water tempering channels is close to hot oil tempering channels.

Cold oil flows slowly, has lower thermal conductivity than water, create a boundary layer with very low flow close to the tempering channel surfaces, and have laminar flow parallel with the tempering channel surface with virtually no flow of oil out from the wall thereby carrying away heat.

Cooling an injection molding tool by means of tempering channels with flowing cold mineral oil is a compromise between several factors, such as:

Small total weight of tool plates, including walls between tempering channels. Metal store heat, and longer narrower thermal energy flow path walls increase the weight.

Large thermal exchange area.

Large temperature difference between tempering fluid and mold or tool plate.

High thermal conductivity of tempering medium.

High tempering medium flow through the tempering channels.

Swirls and turbulence of the tempering fluid flow in the tempering channels moves heat away from walls, break up slow flow layer close to walls, and wash away "sticky" oil from the walls.

Large variation of viscosity with temperature for mineral oil (exponential dependence).

Almost any plastic part can be injection molded using the novel and inventive technology of the present invention substantially without limitations to design of plastic parts molded, since the heating and cooling steps are undertaken in an extremely uniform way and substantially independent of the locations of the one or more cavities of the injections mold.

What is claimed is:

1. A method for injection molding plastic part(s) by means of a low pressure injection molding machine, wherein the method comprises steps of:

(a) fitting the injection molding machine with an injection mold defining one or more molding cavities, the injection mold including an injector mold plate and a reciprocating ejector mold plate, wherein both mold plates have front and back sides with the front side opposite the back side, and the back side of at least one of the mold plates is traversed, respectively, by one or more open lengthwise channels that are made by milling or cutting the backside of the respective mold plate and that extend between an inlet and an outlet each through a free edge of the respective mold plate, with the one or more molding cavities are provided in the front face and the free edge delimited between the front and back sides of the mold plate, wherein each channel has its own inlet and outlet, and one or more of the open lengthwise channels is first finally closed for circulation of a tempering medium once the mold plates are in place in the injection molding machine, (b) providing a feed of plastic material having a first temperature within a processing window of the plastic material, (c) heating at least the one or more molding cavities to a second temperature within the processing window of the plastic material and maintaining the injection mold in closed condition at said second temperature by circulating through the one or more channels a first tempering medium having a third temperature, (d) injecting plastic material having the first temperature into the closed heated mold at an injection pressure less than 100 kg/cm² to fill the one or more molding cavities, (e) cooling at least the one or more molding cavities of the filled closed injection mold to a fourth temperature below the first temperature until at least solidification of the molded plastic part(s) inside the injection mold by circulating through the one or more channels a second tempering medium having a fifth temperature, (f) opening the injection mold by parting the injector mold plate from the ejector mold plate, (g) ejecting at least partly solidified molded plastic part(s) by actuation of ejector pins of the ejector mold plate, and (h) repeating the cycle of steps (c)-(g) until a desired number of plastic parts are produced.

2. A method according to claim 1, wherein the second temperature is equal to or higher than the first temperature, and/or the fifth temperature is lower than the third temperature, and optionally wherein the fifth temperature is lower than a lowest temperature within the processing window of the plastic material, and/or the fourth temperature is lower than a lowest temperature within the processing window of the plastic material.

3. A method according to claim 1, wherein in steps (e) and (g) the molded plastic part(s) proceed(s) to solidification that facilitates ejection of the part(s).

4. A method according to claim 1, wherein step (c) further includes heating a conveyor system for the feed of plastic material to a temperature within the processing window of the plastic material at any location upstream of the injection mold.

5. A method according to claim 1, wherein in step (c) air is evacuated from the one or more molding cavities before proceeding with step (d).

6. A method according to claim 1, wherein the plastic material is a thermoplastic material.

7. A method according to claim 1, wherein one or both of the injector plate and the ejector plate is made of aluminum or an aluminum alloy.

8. A method according to claim 1, wherein in step (d) the injection of plastic material at the first temperature is made at an injection pressure of less than 80 kg/cm² or less than 60 kg/cm², or at an injection pressure of between 20 kg/cm²-50 kg/cm².

9. A method according to claim 1, wherein at least the first tempering medium can be heated to at least a temperature within the processing window of the plastic material, or to at least 150° C., or at least 200° C., or at least 300° C., optionally wherein the first tempering medium is an oil.

10. A method according to claim 1, wherein the first tempering medium and the second tempering medium are circulated through the same one or more open channels or through a different channel or channels, optionally in response to opening and closing one or more valves associated with respective the inlet(s) for the one or more valves.

11. A method according to claim 1, wherein the injector mold plate has an off-centre injector gate, one or more injector gates, or one or more edge gates.

12. A method according to claim 1, wherein either the first tempering medium or the second tempering medium flows in the one or more open channels of any of the ejector mold plate or the injector mold plate designed as a continuous channel having an inlet in one free edge of the respective mold plate and an outlet in an opposite free edge, wherein the one or more open channels between the inlet and the outlet is(are) a chicane of tight turns in opposite directions, which tight turns are defined by a plurality of upright walls that delimit channel legs.

13. A method according to claim 12, wherein at least some of the upright walls are parallel.

14. A method according to claim 1, wherein the one or more channels is configured to include one or more features of
a channel leg turning radius between 6.0 mm-30 mm,
a number of channel legs between 3-10,
a channel legs having a length about 200 mm,
a total length between 600 mm-800 mm,
a depth between 20 mm-60 mm,
a channel leg having a width of 3.0 mm-5.0 mm,
a channel leg thickness between 3.5 mm-5.0 mm, or
a thickness of metal goods between channel and molding cavity of 3.0 mm-5.5 mm.

15. A method according to claim 1, wherein the one or more channels is configured to include one or more features of:
a channel leg having a length of about 140 mm,
five channel legs,
a total length of 700 mm,
a depth of between 20 mm-40 mm,
a channel leg having a width of 4.2 mm,
a channel leg thickness of 3.8 mm, or
a thickness of metal goods between channel and molding cavity of 4.0 mm.

16. A method according to claim 1, wherein the second temperature is higher than the first temperature by at least about 20° C.

17. A method according to claim 1, wherein the fifth temperature is lower than the fourth temperature by at least about 20° C.

18. A method according to claim 1, wherein the second tempering medium is a mineral oil having a fifth temperature of 40° C. or below, or 30° C. or below.

19. A low pressure injection molding machine for injection molding plastic part(s) according to the method of claim 1, the injection molding machine comprising:
- an injection mold including an injector mold plate and a reciprocating ejector mold plate, the plates defining one or more molding cavities in the closed state of an injection mold, wherein both mold plates have front and back sides with the front side opposite the back side, and the back side of at least one of the mold plates is traversed, respectively, by one or more open lengthwise channels that are made by milling or cutting the backside of the respective plate and that extend between an inlet and an outlet each through a free edge of the respective mold plate, with the one or more molding cavities are provided in the front face and the free edge delimited between the front and back sides of the mold plate, wherein each channel has its own inlet and outlet, and one or more of the open lengthwise channels is first finally closed for circulation of a tempering medium once the mold plates are in place in the injection molding machine, which channels are configured for:
    - during injection at an injection pressure less than 100 kg/m² of a plastic material, which is at a first temperature within a processing window of said plastic material, circulating in the one or more molding cavities a first tempering medium having a third temperature of at least a temperature within the processing window of the injected plastic material to heat the one or more molding cavities to a second temperature, and
    - for at least solidification of the molded plastic part(s) inside the injection mold circulating a second tempering medium having a fifth temperature selected for cooling at least the one or more molding cavities of the filled closed injection mold to a fourth temperature below the first temperature,
- a heating system for heating a conveyor system for the feed of plastic material at any location upstream the injection mold to at least a temperature within the processing window of the plastic material,
- a pump arrangement for in turns circulating the first tempering medium having a third temperature and the second tempering medium having a fifth temperature through the one or more channels of the injection mold, and
- a valve system for controlling switching between the first and second tempering medium.

20. An injection molding machine according to claim 19, further comprising an electronic operating system controlled by a computer program for controlling continuous injection molding cycle for obtaining a plastic part.

* * * * *